(12) United States Patent
Johansson et al.

(10) Patent No.: US 8,385,832 B2
(45) Date of Patent: Feb. 26, 2013

(54) INTER-CELL INTERFERENCE CONTROL IN AN UPLINK MULTI-CARRIER RADIO COMMUNICATIONS SYSTEM

(75) Inventors: Klas Johansson, Sundbyberg (SE); Ke Wang Helmersson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 12/695,646

(22) Filed: Jan. 28, 2010

(65) Prior Publication Data

US 2010/0233962 A1    Sep. 16, 2010

Related U.S. Application Data

(60) Provisional application No. 61/160,043, filed on Mar. 13, 2009.

(51) Int. Cl.
*H04B 1/00*    (2006.01)

(52) U.S. Cl. ......... 455/63.1; 455/453; 455/560; 455/69; 455/522; 455/442; 455/67.11; 455/445; 455/561; 455/67.13; 455/226.2; 370/310; 370/342

(58) Field of Classification Search .................. 455/453, 455/560, 69, 522, 442, 67.11, 445, 63.1, 455/561, 67.13, 226.2; 370/310, 342
See application file for complete search history.

(56) References Cited

U.S. PATENT DOCUMENTS

| | | | |
|---|---|---|---|
| 5,854,981 A | 12/1998 | Wallstedt et al. | |
| 5,995,834 A | 11/1999 | Moore | |
| 5,999,811 A | 12/1999 | Molne | |
| 6,157,616 A | 12/2000 | Whitehead | |
| 6,754,505 B1 | 6/2004 | Baker et al. | |
| 7,187,934 B2 | 3/2007 | Turina et al. | |
| 7,302,276 B2 | 11/2007 | Bernhardsson et al. | |
| 7,324,821 B2 | 1/2008 | Kwak et al. | |
| 7,349,504 B2 | 3/2008 | Li et al. | |

(Continued)

FOREIGN PATENT DOCUMENTS

| | | |
|---|---|---|
| EP | 1 503 608 | 2/2005 |
| EP | 1 628 497 A1 | 2/2006 |

(Continued)

OTHER PUBLICATIONS

International Search Report and Written Opinion for International Application No. PCT/SE2010/050208 mailed Jul. 12, 2010.

(Continued)

*Primary Examiner* — April G Gonzales
(74) *Attorney, Agent, or Firm* — Nixon & Vanderhye P.C.

(57) ABSTRACT

A multi-carrier cellular radio communication system includes a serving base station associate with a serving cell currently serving a mobile radio and a non-serving base station within range of the mobile radio and associated with a non-serving cell. The mobile radio can transmit to the serving base station at the same time over multiple radio frequency carriers. An estimate is made of inter-cell interference in the non-serving cell caused by uplink transmission by the mobile radio over one or more of the multiple radio frequency carriers over which the mobile radio is currently simultaneously transmitting. If the estimated inter-cell interference in the non-serving cell exceeds a predetermined threshold, then the inter-cell interference in the non-serving cell is reduced or limited by managing radio resources so that the estimated inter-cell interference in the non-serving cell is or becomes less than the predetermined threshold.

28 Claims, 4 Drawing Sheets

U.S. PATENT DOCUMENTS

| | | | |
|---|---|---|---|
| 7,453,861 B2* | 11/2008 | Leung et al. | 370/342 |
| 7,460,877 B2* | 12/2008 | Terry et al. | 455/522 |
| 7,483,702 B2 | 1/2009 | Yeo et al. | |
| 7,486,954 B2* | 2/2009 | Lee et al. | 455/442 |
| 7,542,451 B2 | 6/2009 | Cooper et al. | |
| 7,577,456 B2 | 8/2009 | Gunnarsson et al. | |
| 7,609,661 B2* | 10/2009 | Chae et al. | 370/310 |
| 7,668,564 B2 | 2/2010 | Onggosanusi et al. | |
| 7,848,292 B2 | 12/2010 | Bi et al. | |
| 8,126,403 B2 | 2/2012 | Wang Helmersson et al. | |
| 2002/0077113 A1 | 6/2002 | Spaling et al. | |
| 2002/0077138 A1 | 6/2002 | Bark et al. | |
| 2002/0111180 A1 | 8/2002 | Hogan et al. | |
| 2002/0123348 A1 | 9/2002 | Willars et al. | |
| 2002/0160767 A1 | 10/2002 | Hanly | |
| 2003/0193907 A1 | 10/2003 | Rezaiifar et al. | |
| 2004/0022207 A1 | 2/2004 | Leung et al. | |
| 2004/0109424 A1 | 6/2004 | Chheda | |
| 2004/0110524 A1 | 6/2004 | Takano et al. | |
| 2004/0157600 A1 | 8/2004 | Stumpert et al. | |
| 2004/0209624 A1* | 10/2004 | Rune et al. | 455/453 |
| 2005/0026617 A1 | 2/2005 | Okuyama | |
| 2005/0043062 A1* | 2/2005 | Ahn et al. | 455/560 |
| 2006/0084443 A1 | 4/2006 | Yeo et al. | |
| 2006/0128392 A1 | 6/2006 | Turina et al. | |
| 2006/0148414 A1 | 7/2006 | Tee et al. | |
| 2006/0178112 A1 | 8/2006 | Wigard | |
| 2006/0194546 A1* | 8/2006 | Gunnarsson et al. | 455/69 |
| 2006/0251031 A1 | 11/2006 | Anderson et al. | |
| 2007/0037577 A1 | 2/2007 | Dalsgaard et al. | |
| 2009/0270109 A1* | 10/2009 | Wang Helmersson et al. | 455/453 |

FOREIGN PATENT DOCUMENTS

| | | |
|---|---|---|
| EP | 1895678 A2 | 5/2008 |
| JP | 2000-505251 | 4/2000 |
| JP | 2005-051568 | 2/2005 |
| WO | WO 97/06648 | 2/1997 |
| WO | WO 2006/043131 | 4/2006 |
| WO | WO 2006/091172 | 8/2006 |

OTHER PUBLICATIONS

TSG-RAM Meeting #43 RP-090014, Biarritz, France, Mar. 3-6, 2009, Source: Nokia Siemens Networks, Nokia "Dual-Cell HSUPA", Agenda item: 13 Document for: Approval, See Chapter 4.
Andrew, L.L.H.; "Measurement-based band allocation in multiband CDMA", INFOCOM '99, 18$^{th}$ Annual Joint Conference of the IEEE Computer and Communications Societies. Proceedings. IEEE, vol. 3, pp. 1364-1371, Mar. 21-25, 1999.
U.S. Appl. No. 11/940,921, filed Nov. 15, 2007; Inventor: Bergstrom et al.
Office Action mailed Sep. 2, 2010 in co-pending U.S. Appl. No. 11/940,921.
Office Action mailed Feb. 18, 2011 in co-pending U.S. Appl. No. 11/940,921.
Office Action mailed Dec. 9, 2010 in co-pending U.S. Appl. No. 12/192,643.
Office Action mailed May 12, 2011 in co-pending U.S. Appl. No. 12/192,643.
Ericsson, 3GPP TSG-RAN WG2 #56, Tdoc R2-063305, Reduction of Neighbour Cell List Information Sent to UE, Riga, Latvia, Nov. 6-10, 2006, pp. 1-5.
3GPP TS 25.331 V5.18.0, "3$^{rd}$ Generation Partnership Project; Technical Specification Group Radio Access Network; Radio Resource Control (RRC); Protocol Specification (Release 5)," Sep. 2006.
GPP TS 25.304 V7.0.0, "3$^{rd}$ Generation Partnership Project; Technical Specification Group Radio Access Network; User Equipment (UE) Procedures in Idle Mode and Procedures for Cell Reselection in Connected Mode (Release 7)," Mar. 2006.
GPP TS 25.133 V7.5.0, "3$^{rd}$ Generation Partnership Project; Technical Specification Group Radio Access Network; Requirements for Support of Radio Resource Management (FDD) (Release 7)," Oct. 2006.
Ericsson, 3GPP TSG-RAN WG2 #57, T-doc R-070561, "Summary of E-Mail Discussion, Proposal to Remove Neighbour Cell Information in E-UTRA," Feb. 2007.
PCT Written Opinion and International Search Report mailed Apr. 28, 2008 in corresponding PCT Application PCT/SE2007/050847.
U.S. Appl. No. 11/066,558, filed Feb. 28, 2005; Inventor: Gunnarsson et al.
Lundin et al, "Uplink Load Estimation in WCDMA", Report No. LiTH-ISY-R-2458, Automatic Control Communication Systems, Mar. 25, 2002.
Gunnarsson et al., "Uplink Admission Control in WCDMA Based on Relative Load Estimates", Report No. LiTH-ISY-R-2414, Automatic Control Communication Systems, Feb. 22, 2002.
International Search Report for International Application No. PCT/SE2006/050010 dated Jun. 2, 2006.
International Search Report mailed Jul. 10, 2009 in corresponding PCT Application PCT/SE2009/050328.
3GPP TR 25.896 V2.0.0 (Mar. 2004), pp. 1-180.
3GPP TSG-RAN WG2 Meeting #45bis, XP-002370693, Jan. 10-14, 2005, pp. 1-46.
Lundin, Uplink Admission Control Based on Estimated Interference in WCDMA Systems, XP-002532489, Jan. 19, 2001, pp. 1-46.
U.S. Appl. No. 12/192,643, filed Aug. 15, 2008; Inventor: Wang Helmersson et al.
U.S. Appl. No. 12/192,643, filed Aug. 15, 2008; Inventor: Helmersson et al.
Office Action mailed May 8, 2012 in co-pending U.S. Appl. No. 11/940,921.
Office Action mailed Aug. 31, 2011 in co-pending U.S. Appl. No. 11/940,921.
Russian official action and English translation, May 29, 2011, in corresponding Russian Application No. 2009122977/09(031698).
Summary of Japanese official action, Dec. 16, 2011, in corresponding Japanese Application No. JP 2009-537121.

* cited by examiner

INTER-CELL INTERFERENCE CONTROL IN AN UPLINK MULTI-CARRIER RADIO COMMUNICATIONS SYSTEM

PRIORITY APPLICATION

This application is claims priority from U.S. provisional patent application Ser. No. 61/160,043, filed on Mar. 13, 2009, the contents of which are incorporated herein by reference.

RELATED APPLICATION

This application is related to commonly-assigned U.S. patent application serial number commonly-assigned U.S. patent application Ser. No. 12/192,643 entitled "Estimating and Limiting Inter-cell Interference," filed on Aug. 15, 2008, now U.S. Pat. No. 8,126,403, the contents of which are incorporated herein by reference.

TECHNICAL FIELD

The technical field relates to radio communications systems, and more particularly, to inter-cell interference control in multi-carrier radio communications systems that support high speed uplink transmissions.

BACKGROUND

Radio access technologies for cellular mobile networks are continuously being evolved to meet future demands for higher data rates, improved coverage, and capacity. One example is the evolution of the WCDMA access technology to provide High-Speed Packet Access (HSPA). With such evolution to higher data rates, the power contributions of users in neighboring cells, which is called inter-cell interference, becomes more significant. FIG. 1 illustrates an example of a mobile radio (shown as a laptop computer) near a border between cell A and cell B. Base station A serves the mobile radio, and base station B is a non-serving base station relative to the mobile radio. As depicted with two arrows, the uplink transmission from the mobile radio is received at both base stations at about the same signal strength. In cell A, that uplink transmission is a desired signal, but in cell B, it is inter-cell interference that adversely impacts the communications quality, capacity, and throughput in cell B. To maintain communications quality, capacity, and throughput in neighboring cells, efficient and effective inter-cell interference control is needed. Inter-cell interference control is also useful for admission and congestion control as well as resource control and allocation, all of which are generally referred to as resource management. Inter-cell interference control assuming single radio frequency carrier uplink transmission is described in the commonly-assigned U.S. patent application serial number commonly-assigned U.S. patent application Ser. No. 12/192,643 entitled "Estimating and Limiting Inter-cell Interference" incorporated by reference above.

Advances in Wideband Code Division Multiple Access (WCDMA) access technology provide Multi-Carrier HSPA (High-Speed Packet Access), including Multi-Carrier HSDPA (MC HSDPA) and Multi-Carrier HSUPA (MC HSUPA) for HSPA in the downlink and uplink, respectively. Multi-carrier transmission in the uplink for example means that a mobile radio simultaneously transmits on multiple radio frequency carriers which permits the mobile radio to achieve very high data rates. Higher data rates require larger transmission power which creates higher inter-cell interference to users in the neighboring cells.

In order to maximize coverage, a mobile radio (often referred to as user equipment (UE) in WCDMA) may need to change from multi-carrier transmission to single-carrier transmission on a "primary carrier" or "anchor carrier." For this purpose, and in order to simplify mobility procedures, selection of a serving cell and an active set for a UE may be based on channel quality measurements on the primary carrier only. But assuming there is adequate coverage and multi-carrier transmission where the UE is transmitting on the primary and one or more secondary carriers simultaneously, if a strong neighbor cell is missing in the UE's active set on a secondary carrier (no soft handover with this neighbor cell), UE transmissions on that secondary carrier in the serving cell may cause significant inter-cell interference in the neighboring cell. To avoid this problem and maintain system performance, coverage, and stability, some sort of inter-cell interference control in a MC-HSUPA system is therefore needed.

Multi-carrier operation in HSDPA, also known as Dual-cell HSDPA, has been a 3GPP Rel-8 work item to support multi-carrier transmission in downlink. To support higher peak rates and to increase cell and system throughput in uplink, multi-carrier operation in uplink transmission has been initiated. As a baseline, a MC-HSUPA system includes multiple legacy radio frequency carriers on which an MC-HSUPA capable UE can transmit simultaneously. The cell's carriers are assumed to be managed by the same base station (often referred to as a Node-B). Scheduling per carrier is presumed to be performed according to baseline HSUPA or Enhanced Uplink EUL.

For the uplink of a WCDMA system, the common resource shared among the terminals is the amount of tolerable interference, i.e., the total received power at the base station. The amount of common uplink resources a UE uses depends on the data rate (e.g., the transport format) at which the UE is transmitting. Generally, higher data rates require larger transmission power, and thus, the resource consumption is higher.

Scheduling, which in HSUPA is handled by the Node-B, is the mechanism determining when a certain UE is allowed to transmit and, if transmission is allowed, at what to maximum data rate. With scheduling, the Node B decides the UE's Transport Format Combination (TFC) selection for the Enhanced Dedicated Channel (E-DCH). The E-DCH scheduling framework is based on scheduling requests sent by the UEs to request resources and scheduling grants sent by the Node B scheduler to control the UE transmission activity.

Two types of scheduling grants are used: absolute grants and relative grants. The absolute grants set an upper power limit the UE may use for data transmission, which determines the maximum data rate. The relative grants update the resource allocation for a UE using one of three values: 'up', 'down', or 'hold', thereby instructing the terminal to increase, decrease, or not change transmit power relative to its current transmit power. Absolute grants can only be transmitted from the E-DCH serving cell, while relative grants can be transmitted from both the serving and non-serving cells. So one way the non-serving cell can control inter-cell interference is by sending relative grants to the UE.

A scheduling grant controls a limit of the E-DPDCH/DPCCH power ratio the UE may use. In the above-identified, commonly-assigned application, a E-TFC selection algorithm is used limit the maximum E-DCH data rate. Because only the UE is aware of the power and buffer situation at the time of transmission, the Node B scheduler can only set an upper limit of the power ratio beyond which the UE is not allowed to transmit. The UE selects a suitable E-TFC based on available UE power. E-DCH users can ask for a higher data rate by sending rate request or setting a "happy bit" to "unhappy."

Mobility management and handover control are performed in the Radio Network Controller (RNC) in WCDMA. In soft handover, a UE maintains radio connections with more than one base station or cell on the same WCDMA radio frequency carrier. All the cells having radio connections with a UE form the UE's active set. To establish a soft handover, radio connection mobility measurements, such as measuring a base station's pilot channel CPICH signal to interference radio, Ec/Io, are carried out at UE/mobile terminal and reported to the RNC.

Establishing soft handover radio connections by including neighbor cells into active set is one way to mitigate inter-cell interference. But soft handover relies on the UE mobility measurements to be reported to RNC which is a relatively slow procedure and thus not optimal from a performance point of view. Moreover, a large number of UEs needs to be in soft handover for this method to be sufficient to control inter-cell interference as higher rates are introduced in a system, A too-large soft handover region might be problematic—not only due to the high RBS hardware, RNC hardware, and Iub transmission link capacity required—but also due to poor signal-to-interference (SIR) ratio in downlink for radio links in non-serving cells having a low path gain relative to the serving cell. In addition, when more than one radio frequency carrier is used for a UE connection, the number of feasible carrier combinations and potential serving/non-serving cells is complicated and complex, Moreover, if a secondary carrier is temporarily deactivated by the Node-B controlling the serving cell, and thus mobility measurements are not available, then when the secondary carrier is reactivated, there will be an additional delay until the active set is updated. As a result, mobility measurements on multi-carriers may not always be available in RNC.

Thus, soft handover and mobility control may not be an optimal approach for controlling inter-cell interference in a multi-carrier uplink transmission system. Moreover, when the mobility control is performed only on one carrier, such as the primary carrier, there are several scenarios where inter-cell interference on one or more secondary carrier(s) can be a problem. One scenario is irregular deployment of multi-carrier base stations, where some base stations can support multi-carriers while others can only support a single carrier. If a multi-carrier UE moves towards a neighbor cell where the primary carrier being used by the UE is not deployed and a secondary carrier being used by the UE is the only carrier in that neighbor cell, then soft handover to the neighbor cell is not possible on the primary carrier. As a consequence, the UE's transmission can cause excessive interference to the neighbor cell on the secondary carrier. Another irregular deployment case is when micro/pico/femto-cells are embedded on one (or multiple) carrier frequencies. If a multi-carrier mobile terminal has one of those micro/pico/femto-cells as a strong neighbor cell on the secondary cannier, and the strong neighbor cell cannot be included in the active set because the mobility control is based on the primary carrier, then the result is as just described where the multi-carrier user may cause excessive interference to UEs in those micro/pico/femto-cells.

Thus, there is a need for inter-cell interference control multi-carrier HSUPA systems on one or more secondary carriers.

SUMMARY

A multi-carrier cellular radio communication system includes a serving base station associate with a serving cell currently serving a mobile radio and a non-serving base station within range of the mobile radio and associated with a non-serving cell. The mobile radio can transmit to the serving base station at the same time over multiple radio frequency carriers. An estimate is made of inter-cell interference in the non-serving cell caused by uplink transmission by the mobile radio over one or more of the multiple radio frequency carriers over which the mobile radio is currently simultaneously transmitting. If the estimated inter-cell interference in the non-serving cell exceeds a predetermined threshold, then the inter-cell interference in the non-serving cell is reduced or limited by managing radio resources so that the estimated inter-cell interference in the non-serving cell is or becomes less than the predetermined threshold.

In a non-limiting, example embodiment, managing radio resources includes limiting output power of the mobile radio on the one or more of the multiple radio frequency carriers. The output power of the mobile radio may be limited on one or more of the multiple radio frequency carriers where either a soft handover radio connection for this mobile radio on the one or more of the multiple radio frequency carriers is not established or soft handover control is not sufficient to limit the estimated inter-cell interference in the non-serving cell caused by the mobile radio. Another example approach is to stop transmission or reduce a data transmission rate by the mobile radio over one or more of the multiple radio frequency carriers for which inter-cell interference is detected. Alternatively, a transport format for the uplink transmission from the mobile radio may be used to limit the estimated inter-cell interference in the non-serving cell to less than the predetermined threshold. Typically, the limiting parameter, (e.g., a lower maximum allowed power using a power value, an offset power value, a decrement signal, or a transport format), is signaled to the mobile radio.

One non-limiting, example application described in the background is a situation where the multiple radio frequency carriers include a primary frequency carrier in the serving cell and a different secondary frequency carrier in the serving cell and in the non-serving cell. The inter-cell interference in the non-serving cell corresponds to interference caused by uplink transmission from the mobile radio on the secondary frequency carrier. The estimated inter-cell interference in the non-serving cell may be based on a downlink measurement of a path gain related quantity associated with the secondary frequency carrier for the non-serving cell and an uplink mobile radio transmission power on the secondary frequency carrier. Non-limiting examples of path gain related quantity include: a path gain measurement, a received signal power, a received signal code power (RSCP), a common pilot channel (CPICH) received signal code power (RSCP), a received signal power relative interference power, or a common pilot channel (CPICH) received signal power relative interference power.

One example embodiment detects that the estimated inter-cell interference in the non-serving cell exceeds a predetermined threshold as follows. A determination is made that the downlink measurement of a path gain related quantity associated with the secondary frequency carrier for the non-serving cell combined with a delta value exceeds a path gain related quantity associated with the secondary frequency carrier for the serving cell. If desired, the delta value can be a cell-specific value and/or can be adjusted based on a load situation or a noise rise for the secondary frequency carrier.

Alternatively, a determination may be made of a total transmission power on the secondary frequency carrier in the serving and non-serving cells from the mobile radio and a combined estimated path gain for the secondary frequency carrier in the serving and non-serving cells. An inter-cell interference for the secondary frequency carrier in the non-serving cell may then be estimated based on the determined total transmission power on the secondary frequency carrier in the serving and non-serving cells from the mobile radio and the determined combined estimated path gain for the secondary frequency carrier in the serving and non-serving cells. Then a determination is made whether the estimated inter-cell interference for the secondary frequency carrier in the non-serving cell exceeds a predetermined interference limit. If desired, the predetermined interference limit can be a cell-specific value and/or can be adjusted based on a load situation or a noise rise for the secondary frequency carrier. In one preferred but still example implementation, the predetermined interference limit for the secondary frequency carrier in the non-serving cell may be inversely related to a current power grant to the mobile radio for uplink transmission over the primary frequency carrier in the serving cell.

In different example embodiments, the mobile radio, the serving base station, or a network node coupled to the serving and non-serving cells estimates the inter-cell interference in the non-serving cell caused by the mobile radio's uplink transmissions on the secondary frequency carrier.

The technology in this case offers many advantages, some examples of which are now described. The inter-cell interference may be quickly limited or reduced on a per radio frequency carrier basis, e.g., on one or more secondary carrier(s), in a MC-HSUPA system. Another example advantage is that the proposed inter-cell interference control can be implemented in many different ways depending on signaling possibilities and desired behavior of the mobile terminal. The technology does not rely on how soft handover is deployed in multi-carrier HSPA, and interference can be controlled faster than the speed at which soft handover radio connections can be established. Secondary carriers that have been previously deactivated by the Node B may be reactivated more quickly. The proposed inter-cell interference control for multi-carrier ultimately improves throughput of the neighboring cell and that of the serving cell. Limiting the output power of a mobile terminal on one carrier may leave power for a higher data rate on one or more other carriers. Reduced inter-cell interference also means the serving cell scheduler can provide the available resources on the carrier to schedule another user in the cell, which is a typical case in a WCDMA system where many mobile users share the scheduling headroom in the cell.

DETAILED DESCRIPTION

In the following description, for purposes of explanation and non-limitation, specific details are set forth, such as particular nodes, functional entities, techniques, protocols, standards, etc. in order to provide an understanding of the described technology. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 1:
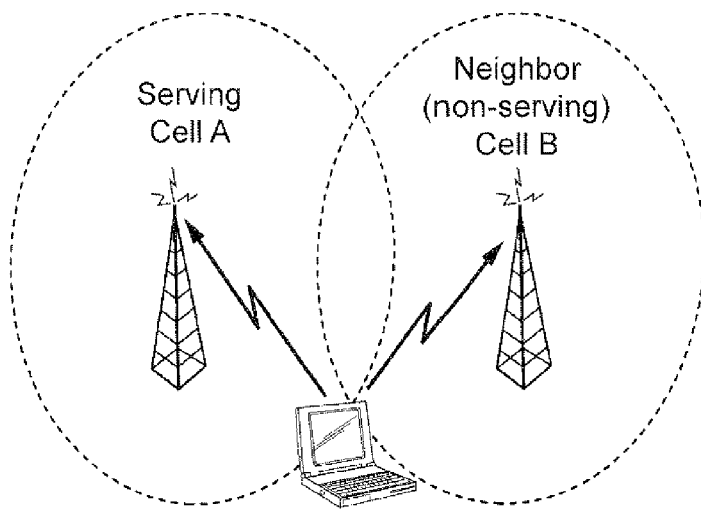
FIG. 1 illustrates a cellular communications system showing inter-cell interference caused by a mobile radio transmitting near a cell border.
Figure 2:
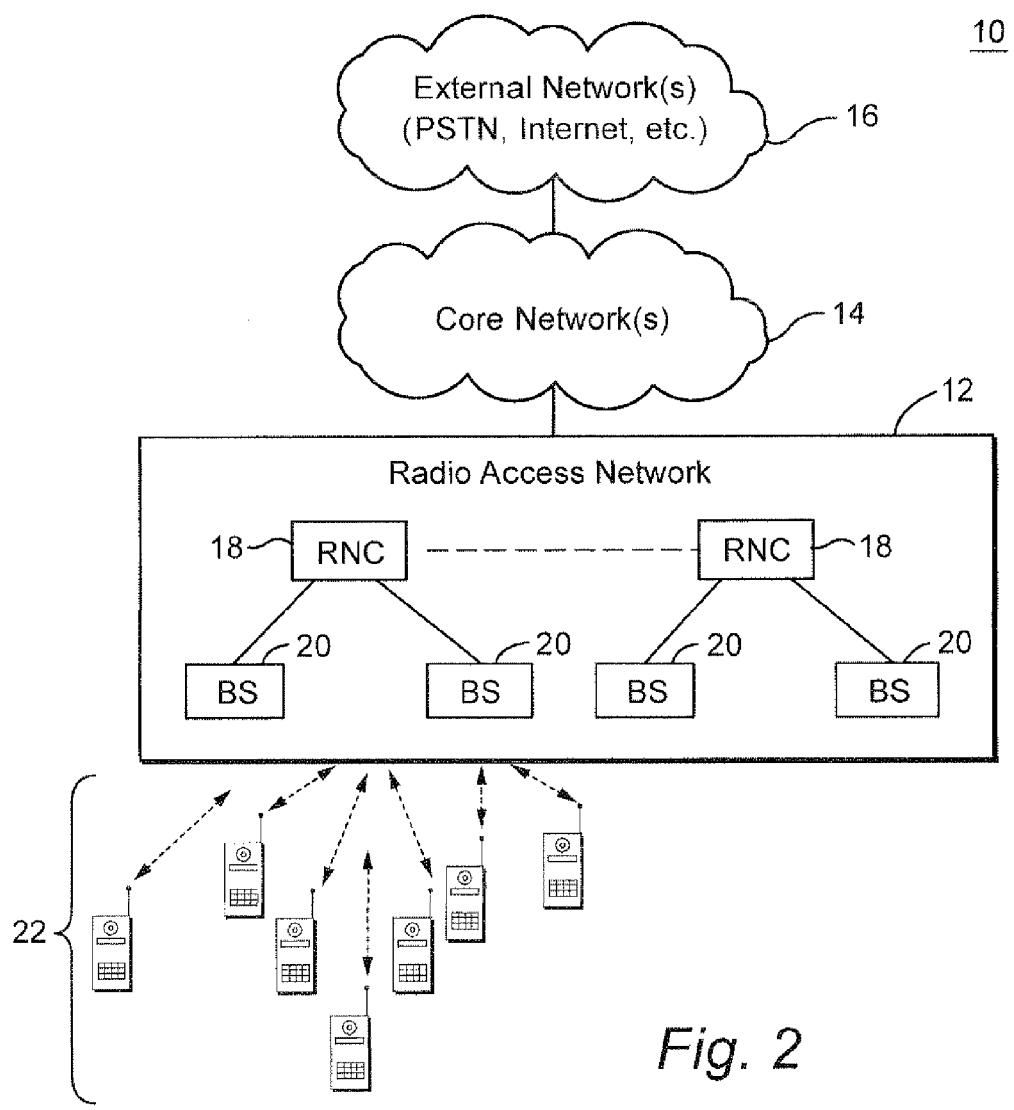
FIG. 2 is a function block diagram of a non-limiting WCDMA example radio communications system.

The technology may be used in any type of cellular radio communications. For ease of description, the term mobile radio is used and encompasses any kind of radio communications terminal/device like user equipment (UE), PDAs, cell phones, laptops, etc. FIG. 2 is a function block diagram of a non-limiting Third Generation (3G) cellular radio system referred to as a Universal Mobile Telecommunications System (UMTS) operating in Code Division Multiple Access (WCDMA) WCDMA indicated generally by reference numeral 10. A radio access network (RAN) 12 is coupled to one or more core networks 14, which in turn, are coupled to one or more external networks 16, like the Internet, the PSTN, ISDN, etc. The radio access network 12 includes, for example, one or more radio network controllers (RNCs) 18 that may communicate signaling and/or traffic to each other. Each RNC 18 controls one or more radio base stations (BSs) 20. Each base station 20 transmits information over an "air" interface in one or more corresponding coverage areas called cells over a variety of downlink radio channels. Each base station 20 also receives uplink communications over the air interface from mobile radios 22 in or near the base station's cell(s) again using one or more uplink channels.

Figure 3:
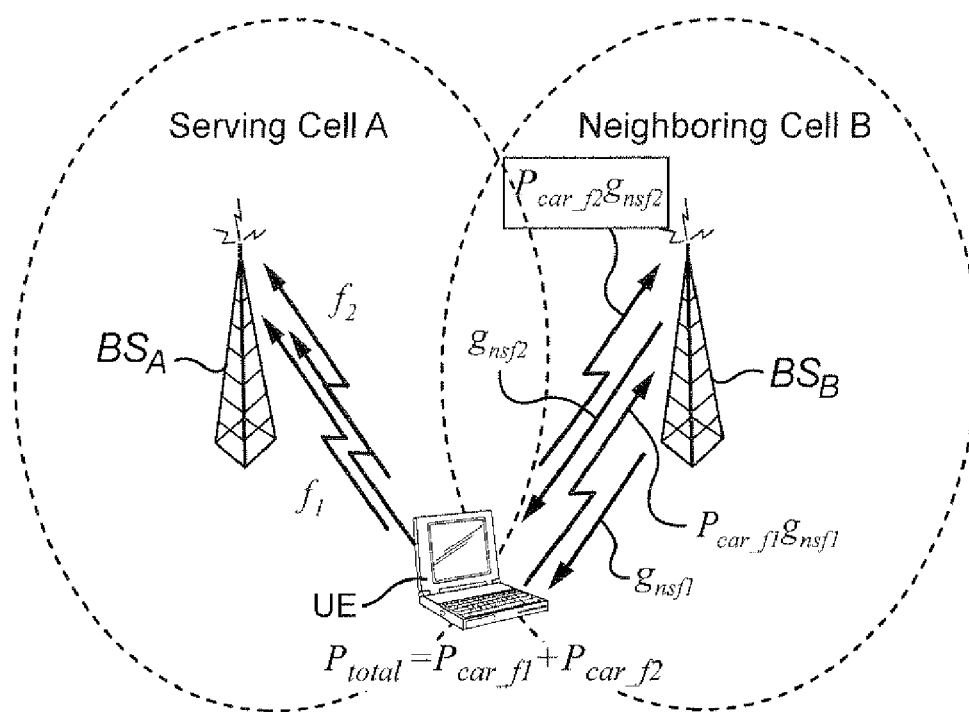
FIG. 3 illustrates the power contribution of a UE to a neighbor cell on multi-carrier HSUPA scenario.

FIG. 3 illustrates the power contribution of a UE to a neighbor cell on multi-carrier HSUPA scenario where multi-carrier refers to multiple (two or more different) radio frequency carriers over which a mobile radio may transmit simultaneously. In a multi-carrier HSUPA scenario, to simplify mobility management handling in the RNC, the baseline mobility control may operate only on one carrier, which is called the primary carrier. The primary carrier for each mobile terminal is selected based on multi-carrier mobility measurements, e.g., CPICH Ec/Io or RSCP. A neighbor cell may also be using one or more of the secondary carriers. If any carrier in the neighbor cell is not included the UE's active SHO set, the multi-carrier UE may cause excessive interference on those carriers in that neighbor cell.

FIG. 3 shows that the UE laptop is simultaneously transmitting on a primary carrier f1 and a secondary carrier f2 to the base station A in the serving cell A. Neighbor non-serving cell B also receives the UE's uplink transmissions on carriers f1 and f2. In this simple MC-HSUPA example, the inter-cell interference generated by a mobile terminal on each carrier differs depending on the power contribution of non-served UEs on each carrier. The UE in FIG. 3 is a non-served UE in cell B. The power contribution depends on the portion of a total transmission power, $P_{car}$, of the non-served UE transmitted on the carrier and a path gain, $g_{ns\_car}$, associated with the carrier from the non-served UE to a neighbor cell. The power contribution to a neighboring cell is estimated by $C_{ns\_car}=P_{car}g_{ns\_car}$. The UE can measure the downlink path gain $g_{ns}$ from base station B on each carrier f1 and f2. The UE's total transmit power in this example is $P_{total}=P_{car\_f1}+P_{car\_f2}$. The inter-cell interference is the power contribution which is generated by the non-served UEs in a cell. So the inter-cell interference C on the secondary carrier 12 in cell B is $C_2=P_{car\_f2}g_{nsf2}$.

Figure 4:
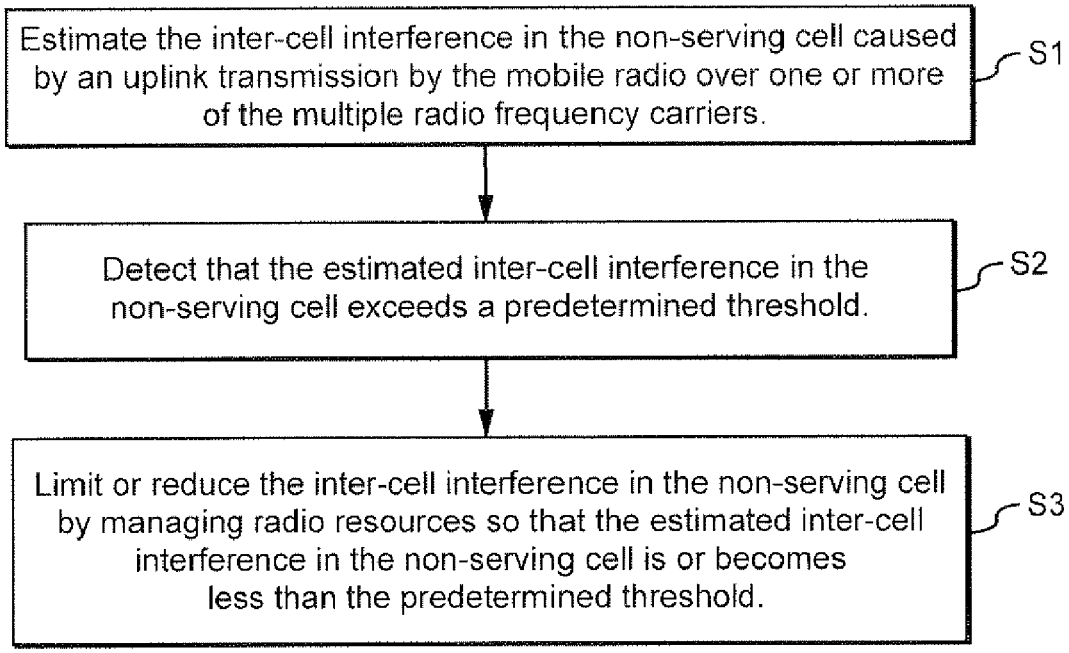
FIG. 4 is a flow chart illustrating example procedures for estimating and controlling inter-cell interference in a multi-carrier HSUPA scenario.

Control of the inter-cell interference on one or more secondary carriers is now described in conjunction with flowchart in FIG. 4. An estimate is made of inter-cell interference in the non-serving cell caused by uplink transmission by the mobile radio over one or more of the multiple radio frequency carriers over which the mobile radio in the serving cell is currently simultaneously transmitting (step S1). If the estimated inter-cell interference in the non-serving cell exceeds a predetermined threshold (step S2), then the inter-cell interference in the non-serving cell is reduced or limited by managing radio resources so that the estimated inter-cell interference in the non-serving cell is or becomes less than the predetermined threshold (step S3).

There are various example ways to detect whether a mobile terminal is causing too much interference in a neighbor cell on a particular one of multiple carriers that the mobile is simultaneously transmitting on. The mobile terminal may monitor path gain with respect to the serving cell and a number of neighbor cells. Based on the measurements, the mobile terminal estimates the path gain difference or delta between the strongest neighbor cell which is not included in the mobile terminal's active set and the serving cell. If the strongest neighbor cell on any carrier is not in the active set and $g_{ns}+\delta_{max}>g_s$, then the inter-cell interference control can be triggered. The maximum path gain difference or delta $\delta_{max}$ may be a static value, may be cell-specific, and/or it may be dynamically adjusted. Example methods for determining maximum path gain difference or delta $\delta_{max}$ are described in the commonly-assigned application referenced above.

In another example embodiment that may used alone or in combination with the maximum path gain delta approach, a transmission power on a carrier $P_{car}$ can be included in calculating a power contribution or inter-cell interference contributed by a mobile terminal: $C_{ns\_car}=P_{car}g_{ns\_car}$. If the inter-cell interference generated by the UE on a carrier exceeds an interference limit, $C_{max}$, i.e., $C_{ns\_car}=P_{car}g_{ns\_car}>C_{max}$, then inter-cell interference control may be triggered. The maximum interference limit, $C_{max}$, may be a static value, may be cell-specific, and/or it may be dynamically adjusted. Example methods for determining the maximum interference limit $C_{max}$ are described in the commonly-assigned application referenced above. A dynamic adjustment of the parameters $\delta_{max}$ and/or $C_{max}$, as the commonly-assigned application describes for a single carrier scenario, can be applied to a multi-carrier scenario, where the load situation or noise rise on each carrier is taken into account in the selection of $\delta_{max}$ and/or $C_{max}$.

A cell-specific selection of $\delta_{max}$ and/or $C_{max}$ can account for different cells being equipped with different tower mounted amplifier (TMAs) and/or different receivers. The TMA compensation for uplink feeder loss may impact the accuracy of the estimated path gain used for inter-cell interference control. The TMA compensation for uplink feeder loss impacts the accuracy of the estimated path gain used for inter-cell interference control. Given that TMA compensation can be cell-specific, $\delta_{max}$ and/or $C_{max}$ may also be cell-specific. The impact of TMA differences can be encoded in the $\delta_{max}$ and/or $C_{max}$ values since the TMA differences are known in the RNC or other network node. Another example for using a cell-specific inter-cell interference limit relates to receiver equipment. The non-serving cell may be equipped with a G-RAKE+ receiver with the capability to suppress some inter-cell interference. The impact of inter-cell interference for a base station equipped with a G-RAKE receiver may not be as large as it would be for a base station without a G-RAKE receiver. Hence, the threshold to trigger the inter-cell interference may be different to account for such differences. These differences could be encoded in cell individual offset (CIO), or encoded in the cell individual values, $\delta_{max}$ and/or $C_{max}$, since the impact of the G-RAKE+ receiver differences are usually known in the RNC or other network node.

The $\delta_{max}$ and/or $C_{max}$ values can be set dynamically if signaling from the non-serving cell exists, e.g., a signal similar to relative grant from non-serving cells when the mobile radio is in soft handover. In that case, $\delta_{max}$ and/or $C_{max}$ can be adaptively adjusted based on the non-serving cell load. For example, if the non-serving cell is interfered with by the mobile radio and needs to limit the inter-cell interference of the mobile radio uplink transmission quickly, the non-serving cell can decrease the interference limit $C_{max}$. If a non-serving cell is not adversely affected by the interference from the mobile radio, then the non-serving cell can relax the limit or allow the mobile radio to transmit without the limit.

Note that the path gain estimation may be based on the downlink frequency measurement. The differences in uplink and downlink frequencies and frequency band situations, e.g., 1800 MHz, 900 MHz, etc., may be taken into account either in the estimation of the path gain, see for example U.S. Pat. No. 7,302,276 incorporated herein by reference, or in the selection of parameter $\delta_{max}$ and $C_{max}$.

When the inter-cell interference is detected on or trigged for one of the multi-carriers, the output power of the mobile terminal on that carrier is modified, e.g., limited. One example approach is to switch off the transmission on the interfered carrier. Another example is to reduce the data rate on the carrier where inter-cell interference is detected or is triggered. An example implementation for data rate control is to limit the transport format combination (TFC) for the uplink transmission on that carrier. Details are provided in the commonly-assigned application mentioned above.

As an alternative example embodiment, the allowed interference ($C_{max}$) for the interfered (secondary) carrier may be defined as a diminishing function of the current uplink transmission power grant for the UE on the primary carrier. An advantage of such a dependency between a primary and one or more secondary carriers is that a more aggressive interference control is applied if propagation and interference conditions are favorable on the primary carrier. For example, a high bit rate may be used on the primary carrier and the bit rate on a secondary carrier is limited to a low value or even 0 to avoid inter-cell interference on the secondary carrier.

Three alternative non-limiting example embodiments are described to operate the inter-cell interference control including a UE-based solution, a Node B or base station-based solution, and an RNC-based solution.

Figure 5:
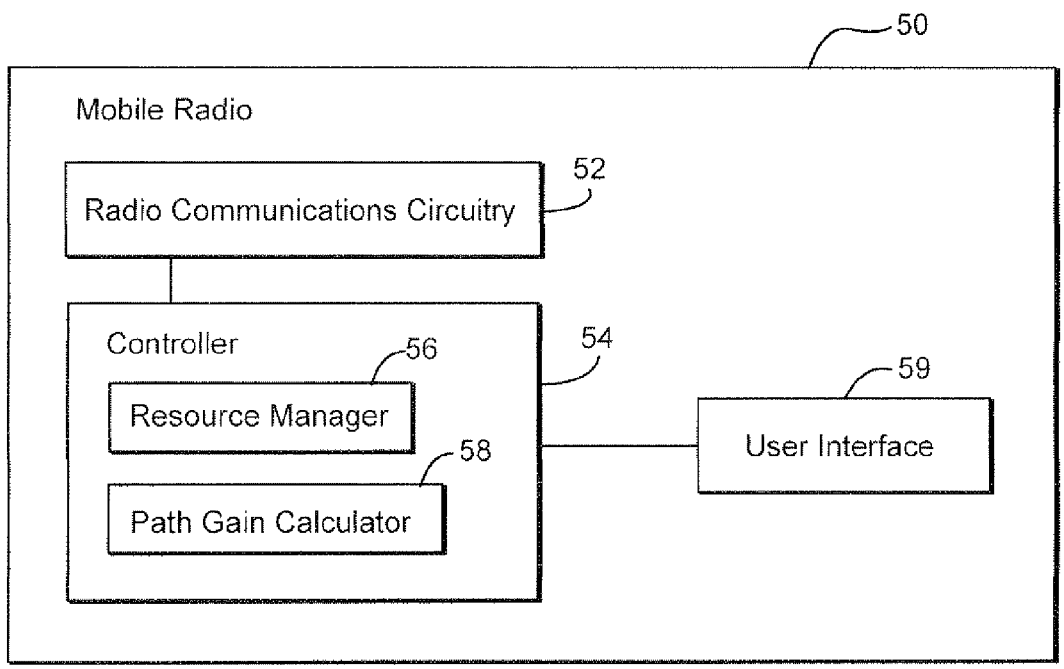
FIG. 5 illustrates a function block diagram of a mobile station that may be used in a non-limiting, example embodiment for estimating and controlling inter-cell interference in a multi-carrier HSUPA scenario.

FIG. 5 illustrates a function block diagram of a mobile station that may be used in the above non-limiting, example embodiment. Mobile radio 50 includes radio communications circuitry 52 coupled to a controller 54. The controller 54 is also coupled to a user interface 59 (coupled to a speaker, microphone, keypad, touchpad, or display, etc.) for communication with a user. The radio communications circuitry 50 receives base station pilot signals and/or other downlink signals from base stations for each carrier from which or that includes the transmission power at which the signal was transmitted for each carrier by its base station and provides those power values to a path gain calculator 58. In addition to determining absolute carrier path gain values for monitored base stations, the path gain calculator 58 may be used to determine relative carrier path gains for used by the base station in the base station-based embodiment. Uplink carrier relative path gains may be determined using downlink path gain values and making the assumption that the uplink carrier path gain is approximately the same as the downlink path gain for that carrier. The controller 54 further includes a resource manager 56 that manages uplink resources based on path gain. The mobile radio compares the estimated inter-cell interference for each of the multiple radio frequency carriers with a threshold value, and if the threshold is exceeded, the mobile radio decreases the resources (e.g., power, data rate, etc.) used for the uplink signal transmission on that carrier or carriers.

In the serving base station based example embodiment, some signaling is required since neither the mobile's inter-cell interference nor the path gain for neighboring cells is available at the serving base station. Three non-limiting example signaling alternatives are now described. In the first alternative, the mobile radio simply reports to the serving base station the mobile's inter-cell interference on each of the multiple radio frequency carriers to neighboring cells. The mobile's report can be either periodic or event-triggered. In a second alternative, the mobile radio signals a "relative" path gain, $g_{ns}/g_s$, calculated by the path gain calculator 58 for each carrier, as described above, to the serving base station. The serving base station can then estimate the inter-cell interference for each carrier generated by the mobile's uplink transmission based on the relative path gain $g_{ns}/g_s$ and the received uplink power contribution from the mobile radio at the serving base station, $C_s = P_{total} g_s$, as follows:

$$\hat{C}_{ns} = P_{total} \cdot g_{ns}/g_s \cdot g_s = C_s \cdot g_{ns}/g_s$$

The equation is carrier-specific and thus must be calculated separately for each carrier. A third alternative is to signal the base station whenever inter-cell interference control is triggered, either from the mobile radio if the estimation of inter-cell interference is done at the mobile terminal or from a network node like an RNC if the estimation of inter-cell interference is done at the network node.

If the serving base station is informed of the inter-cell interference on any carrier from the mobile radio transmission to the non-serving neighboring cell, $\hat{C}_{ns} = P_{total} g_{ns}$, via uplink signaling from the mobile, then the base station can trigger inter-cell interference control for that carrier whenever the estimated or signaled inter-cell interference of the user on that carrier exceeds a corresponding interference limit $C_{max}$:

$$\hat{C}_{ns} > C_{max}$$

The serving base station can also trigger inter-cell interference control per carrier based On the relative path gain, $g_{ns}/g_s$, if the relative path gain for each carrier is signaled from the mobile radio to the base station. Inter-cell interference control for each carrier may be triggered when the relative path gain is close to 1, or when $g_{ns} + \delta_{max} > g_s$ in dB scale as described earlier.

Figure 6:
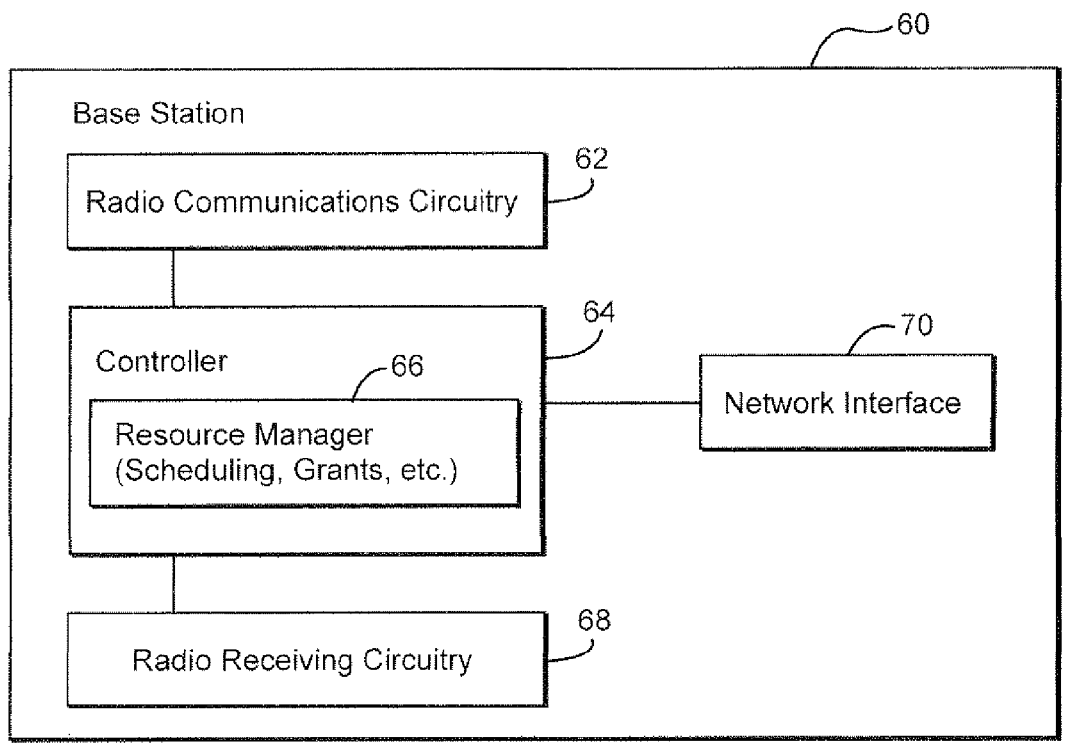
FIG. 6 illustrates a function block diagram of a base station that may be used in a non-limiting, example embodiment for estimating and controlling inter-cell interference in a multi-carrier HSUPA scenario.

FIG. 6 illustrates a function block diagram of a base station 60 that may be used in the base station-based, non-limiting, example embodiment. The base station 60 includes radio communications circuitry 62 coupled to a controller 64. The controller 64 is also coupled to a network interface 70 for communication with the rest of the radio network. The controller includes a resource manager 66 that receives from the mobile radio relative path gain data or relative path gain measurement data from which relative path gain can be calculated for one or more carriers. As described above, the resource manager 66 manages uplink resources using that relative path gain and received uplink power for each carrier from the mobile radio to determine an estimated inter-cell interference for each carrier which is then compared with a corresponding threshold value. If the threshold is exceeded, then the base station signals to the mobile station to decrease transmission power, data rate, TFC, etc. used for uplink signal transmission on the corresponding carrier.

In the base station embodiment for interference control, an information element may be used to carry a value associated with an estimated path gain $g_s/\max(g_{ns\_car})$ with respect to one or more strongest neighbor cells of all monitored carriers and neighbor cells in a Scheduling Information (SI) message sent by the UE to the base station. The path gain of the serving cell with respect to a strongest neighbor cell on the same carrier is called the relative path gain, which is supported in HSUPA. With this information, the base station can limit the output transmit power of the mobile terminal, e.g., by deactivating transmission on that carrier, reducing the data rate on that specific carrier, changing the TFC, etc.

As mentioned above, it may be desirable to take into account the downlink channel quality condition, e.g., as represented by a received channel quality indicator (CQI). A For example, a poor CQI2 on the secondary carrier relative to a good CQI1 on the primary carrier indicates a strong neighbor cell. The transmission power grant for the UE on the secondary carrier may be a diminishing function of $\Delta CQI$, where $\Delta CQI = CQI1 - CQI2$ (preferably averaged to avoid fluctuations due to fast fading). As an example, UE transmission on the secondary carrier may be deactivated if $\Delta CQI > 6$ dB.

A third non-limiting embodiment is controlled by an RNC or other network node. Mobility management is carried out in the RNC based on mobility measurements at the mobile terminal. In a multi-carrier scenario, inter-cell interference control can be needed on some carriers where soft handover may not be necessary or possible. For example, the region to control the inter-cell interference on a carrier is larger than the region for soft handover. As a result, new mobility measurements and events may be designated for multi-carrier to trigger inter-frequency handover (including change of primary carrier and serving cell) in case a strong neighbor cell appears on one of one or more secondary carrier(s). In addition to the inter-frequency handover, the RNC carries out a reconfiguration from multi-carrier mode to single-carrier mode if the mobile terminal changes from a multi-carrier (MC) serving cell to a strong neighbor cell where only single carrier (SC) is deployed. If the mobile terminal changes from SC deployed serving cell to the strong neighbor cell where MC carrier is deployed, a reconfiguration from single-carrier mode to multi-carrier mode is carried out in the RNC. A separate mobility measurement and event may be defined and triggered to control inter-cell interference but not to establish a soft handover radio connection on the same carrier.

Recognizing that the inter-cell interference, $C_{ns} = P_{total} g_{ns}$, estimated at the mobile radio terminal for each carrier is not available at RNC, three non-limiting example alternatives for RNC to estimate the inter-cell interference of the mobile radio for one or more carriers are now described. First, uplink signaling from the mobile radio to RNC simply reports the inter-cell interference for each carrier to one or more neighboring cells determined by the mobile radio. The report provided to the RNC either from mobile radio terminal or via the serving base station can be either periodic or event-triggered.

Figure 7:
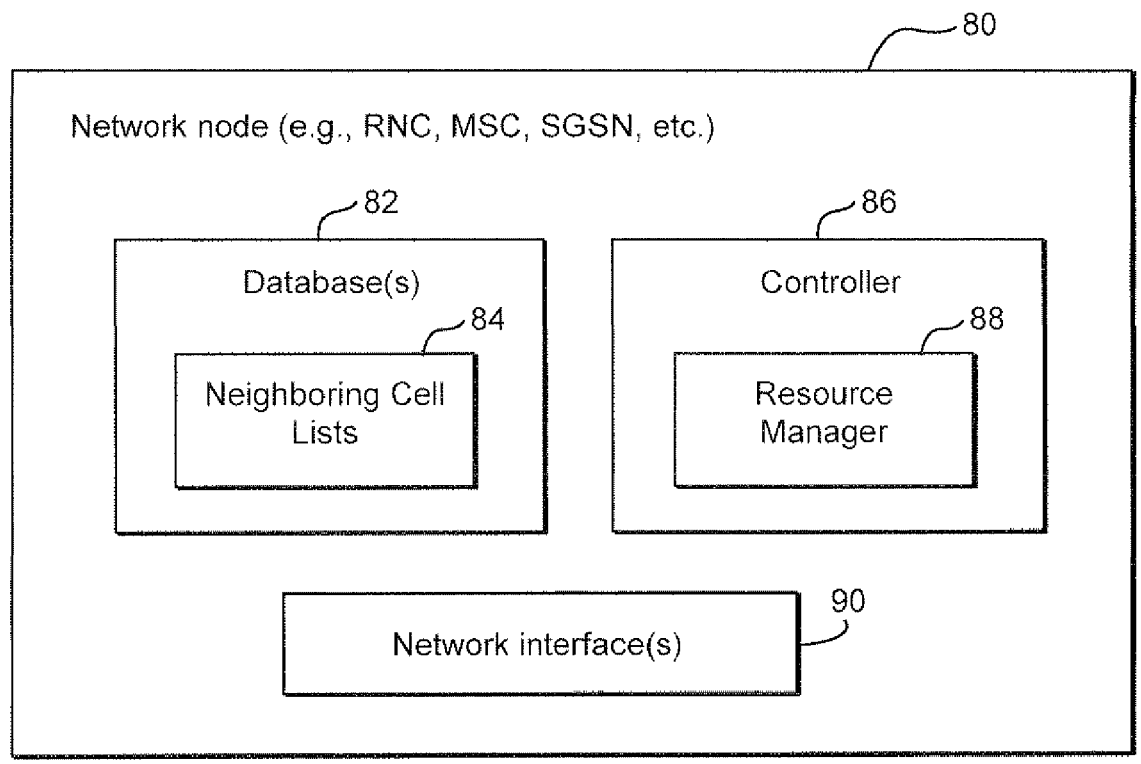
FIG. 7 illustrates a function block diagram of a network controller that may be used in a non-limiting, example embodiment for estimating and controlling inter-cell interference in a multi-carrier HSUPA scenario.

FIG. 7 illustrates a function block diagram of a network node 80 that may be used in the network node-based, non-limiting, example embodiment. The network node described above was an RNC, but other example nodes could be a base station controller (BSC), a mobile switching center (MSC), a serving GPRS support node (SSGN), a gateway GPRS support node (GGSN), or an MME gateway. The network node 80 may include one or more databases 82 for storing information reported from mobile stations or determined from reported information. One example is neighbor cells list information. The database(s) is(are) coupled to a controller 86. The controller 86 is also coupled to a network interface 70 for communication with the radio and often other networks. The controller 86 includes a resource manager 88 that receives from the mobile radio one or more reports such as inter-cell interference reports as just described. The resource manager 86 compares the estimated inter-cell interference for each carrier with a corresponding threshold value, and if the threshold is exceeded, then the resource manager signals to the mobile station either directly or via the serving base station to decrease transmission power, data rate, TFC, etc. used for the uplink signal transmission over that carrier.

In a second alternative, the mobile radio reports its path gain measurements per carrier to serving and non-serving base stations to the network nodes resource manager 86. Based on the path gain measurement reports, the resource manager 86 estimates a path gain $\hat{g}_s$ of the serving base station and a highest path gain $\hat{g}_{ns}$ of monitored non-serving cells for the mobile radio for each carrier. The inter-cell interference generated by the mobile on each carrier is then determined based on the corresponding relative path gain, i.e., a difference of these two path gains $\hat{g}_{ns}-\hat{g}_s$ assuming a logarithmic scale. A third alternative is based on the noise rise measurement of the serving cell and neighboring cells to the resource manager 86 for the carrier in addition to the normal path gain measurement report. From that information, the resource manager 86 estimates a noise rise of the most interfered neighboring cell for the carrier and combines the estimated noise rise level together with the relative path gain estimation $\hat{g}_{ns}-\hat{g}_s$ to calculate the inter-cell interference generated by the mobile radio on that carrier.

The resource manager 86 can trigger inter-cell inference control based on such signaling measurement reports from the mobile radio and the serving base station. Some example alternatives are now described that depend on the signaling alternative employed and availability of the measurement reports. If an inter-cell inference report, $\hat{C}_{ns}$, is provided to the resource manager 86, the resource manager 86 may trigger inter-cell interference control when that reported inter-cell inference from the mobile radio exceeds an inter-cell interference threshold limit $C_{max}$, which is the condition in equation (6). If mobile radio's inter-cell inference to neighbor cells is not reported to the resource manager 86, the resource manager 86 can trigger inter-cell interference control based on path gain measurement reports provided by mobile radios. In this case, the resource manager 86 can trigger carrier inter-cell interference control if:

$$\hat{g}_{ns} > \hat{g}_s - \delta_{max}$$

while the neighboring cell is not in active set. Moreover, if the resource manager 86 can estimate per carrier the noise rise of the serving cell, $\eta_s$, and the noise rise of non-serving cell, $\eta_{ns}$, based on a noise rise measurement report from the base station, together with the path gain estimation of the serving cell, $\hat{g}_s$, and the path gain estimation of the highest non-serving cells, $\hat{g}_{ns}$, the RNC can trigger inter-cell interference control based on satisfaction of the conditions in equations (9) and (10):

$$\begin{cases} \hat{g}_{ns} > \hat{g}_s - \delta_{max} \\ \eta_{ns} > \eta_{max} \end{cases}$$

$$\begin{cases} \hat{g}_{ns} > \hat{g}_s - \delta_{max} \\ \eta_{ns} > \eta_s - \delta_{nr} \end{cases}$$

where $\eta_{max}$ is the maximum allowed noise rise level in a cell and $\delta_{nr}$ can be a margin of noise rise between serving cell and non-serving cell. Both $\eta_{max}$ and $\delta_{nr}$ can be defined as cell or system parameters.

The technology estimates, and when necessary, limits inter-cell interference in a multi-carrier system. As described using various non-limiting examples, the multi-carrier system inter-cell interference estimation and control can be implemented in many different ways depending on signaling possibilities and other factors. The technology does not require the mobile radio to be in soft handover, and multi-carrier inter-cell interference can be controlled quickly and before soft handover. Accurate and efficient multi-carrier inter-cell interference estimation and control improves the throughput of the neighboring cell and the serving cell in multi-carrier systems.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for use in a multi-carrier cellular radio communication system that includes a serving base station currently serving a mobile radio in a serving cell and a non-serving base station within range of the mobile radio and associated with a non-serving cell, where the mobile radio transmits to the serving base station at the same time over multiple radio frequency carriers including a primary frequency carrier in the serving cell and a different secondary frequency carrier in the serving cell and in the non-serving cell, the method comprising:

(a) estimating inter-cell interference in the non-serving cell caused by uplink transmission by the mobile radio on the secondary frequency carrier, the uplink transmission being simultaneously transmitted to the serving base station by the mobile station over the primary frequency carrier and the secondary frequency carrier;

(b) detecting that the estimated inter-cell interference in the non-serving cell exceeds a predetermined threshold; and (c) reducing or limiting the inter-cell interference in the non-serving cell by managing radio resources so that the estimated inter-cell interference in the non-serving cell is or becomes less than the predetermined threshold.

2. The method in claim 1, wherein managing radio resources includes limiting output power of the mobile radio on the one or more of the multiple radio frequency carriers.

3. The method in claim 2, wherein output power of the mobile radio is limited on one or more of the multiple radio frequency carriers where either a soft handover radio connection for this mobile radio on the one or more of the multiple radio frequency carriers is not established or soft handover control is not sufficient to limit the estimated inter-cell interference in the non-serving cell caused by the mobile radio.

4. The method in claim 1, wherein the estimated inter-cell interference in the non-serving cell is based on a downlink measurement of a path gain related quantity associated with one of the multiple radio frequency carriers and an uplink mobile radio transmission power on the corresponding radio frequency carrier.

5. The method in claim 4, wherein the path gain related quantity is one of the following: a path gain measurement, a received signal power, a received signal code power (RSCP), a common pilot channel (CPICH) received signal code power (RSCP), a received signal power relative interference power, or a common pilot channel (CPICH) received signal power relative interference power.

6. The method in claim 1, wherein the step of detecting that the estimated inter-cell interference in the non-serving cell exceeds a predetermined threshold includes:

determining that the downlink measurement of a path gain related quantity associated with the one radio frequency carrier from the non-serving cell combined with a delta value exceeds a path gain related quantity associated with the corresponding radio frequency carrier from the serving cell.

7. The method in claim 6, wherein the delta value is a cell-specific value.

8. The method in claim 6, further comprising adjusting the delta value based on a load situation or a noise rise for the one radio frequency carrier.

9. The method in claim 1, wherein the step of detecting that the estimated inter-cell interference in the non-serving cell exceeds a predetermined threshold includes:

determining a total transmission power on one radio frequency carrier from the mobile radio and combined with an estimated path gain for the corresponding radio frequency carrier in the serving and non-serving cells, estimating an inter-cell interference for the one radio frequency carrier in the non-serving cell based on the determined total transmission power on the one radio frequency carrier from the mobile radio and the estimated path gain for the corresponding radio frequency carrier in the serving and non-serving cells, and determining if the estimated inter-cell interference for the one radio frequency carrier in the non-serving cell exceeds a predetermined interference limit.

10. The method in claim 9, wherein the predetermined interference limit is a cell-specific value.

11. The method in claim 9, further comprising adjusting the predetermined interference limit based on a load situation or a noise rise for the one radio frequency carrier.

12. The method in claim 9, wherein the predetermined interference limit for the one radio frequency carrier is inversely related to a current power grant to the mobile radio for uplink transmission.

13. The method in claim 1, wherein the step of reducing or limiting the inter-cell interference in the non-serving cell by managing radio resources includes stopping transmission or reducing a data transmission rate by the mobile radio over one or more of the multiple radio frequency carriers for which inter-cell interference is detected.

14. The method in claim 1, wherein the mobile radio estimates the inter-cell interference in the non-serving cell caused by the mobile radio's uplink transmissions on the one or more of the multiple radio frequency carriers.

15. The method in claim 1, wherein the serving base station estimates the inter-cell interference in the non-serving cell caused by the mobile radio's uplink transmissions on the one or more of the multiple radio frequency carriers based on information received from the mobile radio.

16. The method in claim 1, wherein a network node coupled to the serving and non-serving cells estimates the inter-cell interference in the non-serving cell caused by the mobile radio's uplink transmissions on the one or more of the multiple radio frequency carriers based on information received from the mobile radio.

17. The method in claim 1, wherein the limiting step (c) includes determining a transport format for the uplink transmission from the mobile radio that limits the estimated inter-cell interference in the non-serving cell to less than the predetermined threshold.

18. The method in claim 1, wherein the limiting step (c) includes signaling to the mobile radio a lower maximum allowed power using a power value, an offset power value, a decrement signal, or a transport format.

19. Apparatus for use in a cellular radio communication system that includes a serving base station associated with a serving cell currently serving a mobile radio and a non-serving base station within range of the mobile radio and associated with a non-serving cell, where the mobile radio transmits to the serving base station at the same time over multiple radio frequency carriers including a primary frequency carrier in the serving cell and a different secondary frequency carrier in the serving cell and in the non-serving cell, the apparatus comprising electronic circuitry configured to:

estimate inter-cell interference in the non-serving cell caused by uplink transmission by the mobile radio on the secondary frequency carrier, the uplink transmission being simultaneously transmitted to the serving base station by the mobile station over the primary frequency carrier and the secondary frequency carrier;

detect that the estimated inter-cell interference in the non-serving cell exceeds a predetermined threshold; and reduce or limit the inter-cell interference in the non-serving cell by managing radio resources so that the estimated inter-cell interference in the non-serving cell is or becomes less than the predetermined threshold.

20. The apparatus in claim 19, wherein the estimated inter-cell interference in the non-serving cell is based on a downlink measurement of a path gain related quantity.

21. The apparatus in claim 19, wherein the path gain related quantity is one of the following: a path gain measurement, a received signal power, a received signal code power (RSCP), a common pilot channel (CPICH) received signal code power (RSCP), a received signal power relative interference power, or a common pilot channel (CPICH) received signal power relative interference power.

22. The apparatus in claim 19, wherein the mobile radio includes circuitry configured to estimate the inter-cell interference in the non-serving cell caused by the mobile radio's uplink transmissions.

23. The apparatus in claim 19, wherein the serving base station includes circuitry configured to estimate the inter-cell interference in the non-serving cell caused by the mobile radio's uplink transmissions based on information received from the mobile radio.

24. The apparatus in claim 19, wherein a network node coupled to the serving and non-serving cells includes circuitry configured to estimate the inter-cell interference in the non-serving cell caused by the mobile radio's uplink transmissions based on information received from the mobile radio.

25. The apparatus in claim 19, wherein the electronic circuitry is configured to determine that the downlink measurement of a path gain related quantity associated with one of the multiple radio frequency carriers for the non-serving cell combined with a delta value exceeds a path gain related quantity associated with the one radio frequency carrier for the serving cell.

26. The apparatus in claim 19, wherein the electronic circuitry is configured to:
  determine a total mobile transmission power on one of the multiple radio frequency carriers in the serving and non-serving cells from the mobile radio and a combined estimated path gain for the one radio frequency carrier in the serving and non-serving cells,
  estimate an inter-cell interference for the one radio frequency carrier in the non-serving cell based on the determined total mobile transmission power on the one radio frequency carrier in the serving and non-serving cells from the mobile radio and the determined combined estimated path gain for the one radio frequency carrier in the serving and non-serving cells, and
  determine if the estimated inter-cell interference for the one radio frequency carrier in the non-serving cell exceeds a predetermined interference limit.

27. The apparatus in claim 19, wherein the predetermined interference limit for the one of the multiple radio frequency carriers is inversely related to a current power grant to the mobile radio for uplink transmission.

28. A multi-carrier cellular radio communication system that includes a serving base station associated with a serving cell currently serving a mobile radio and a non-serving base station within range of the mobile radio and associated with a non-serving cell, where the mobile radio transmits to the serving base station at the same time over multiple radio frequency carriers including a primary frequency carrier in the serving cell and a different secondary frequency carrier in the serving cell and in the non-serving cell, the system comprising:
  means for estimating inter-cell interference in the non-serving cell caused by uplink transmission by the mobile radio over on the secondary frequency carrier, the uplink transmission being simultaneously transmitted to the serving base station by the mobile station over the primary frequency carrier and the secondary frequency carrier;
  means for detecting that the estimated inter-cell interference in the non-serving cell exceeds a predetermined threshold; and
  means for reducing or limiting the inter-cell interference in the non-serving cell by managing radio resources so that the estimated inter-cell interference in the non-serving cell is or becomes less than the predetermined threshold.

* * * * *

UNITED STATES PATENT AND TRADEMARK OFFICE
CERTIFICATE OF CORRECTION

PATENT NO. : 8,385,832 B2
APPLICATION NO. : 12/695646
DATED : February 26, 2013
INVENTOR(S) : Johansson et al.

It is certified that error appears in the above-identified patent and that said Letters Patent is hereby corrected as shown below:

Title Page 2, in Item (56), under "OTHER PUBLICATIONS", in Column 2, Line 11, delete "GPP" and insert -- 3GPP --, therefor.

Title Page 2, in Item (56), under "OTHER PUBLICATIONS", in Column 2, Line 15, delete "GPP" and insert -- 3GPP --, therefor.

Title Page 2, in Item (56), under "OTHER PUBLICATIONS", in Column 2, Line 26, delete "et al," and insert -- et al., --, therefor.

In the Specification

In Column 2, Line 41, delete "what to maximum" and insert -- what maximum --, therefor.

In Column 2, Line 62, delete "a E-TFC" and insert -- an E-TFC --, therefor.

In Column 3, Line 20, delete "system, A" and insert -- system. A --, therefor.

In Column 3, Line 29, delete "complex, Moreover," and insert -- complex. Moreover, --, therefor.

In Column 7, Line 12, delete "12" and insert -- f2 --, therefor.

In Column 9, Line 2, delete "radio communications circuitry 50" and
insert -- radio communications circuitry 52 --, therefor.

In Column 9, Line 60, delete "On" and insert -- on --, therefor.

In Column 11, Line 16, delete "network interface 70" and insert -- network interface 90 --, therefor.

Signed and Sealed this
Twenty-sixth Day of November, 2013

Margaret A. Focarino
*Commissioner for Patents of the United States Patent and Trademark Office*

CERTIFICATE OF CORRECTION (continued)
U.S. Pat. No. 8,385,832 B2

In Column 11, Lines 20-21, delete "resource manager 86" and insert -- resource manager 88 --, therefor.

In Column 11, Line 29, delete "resource manager 86." and insert -- resource manager 88. --, therefor.

In Column 11, Lines 30-31, delete "resource manager 86" and insert -- resource manager 88 --, therefor.

In Column 11, Lines 38-39, delete "resource manager 86" and insert -- resource manager 88 --, therefor.

In Column 11, Lines 40-41, delete "resource manager 86" and insert -- resource manager 88 --, therefor.

In Column 11, Line 46, delete "resource manager 86" and insert -- resource manager 88 --, therefor.

In Column 11, Line 52, delete "resource manager 86, the resource manager 86 may" and insert -- resource manager 88, the resource manager 88 may --, therefor.

In Column 11, Lines 57-58, delete "resource manager 86, the resource manager 86" and insert -- resource manager 88, the resource manager 88 --, therefor.

In Column 11, Line 60, delete "resource manager 86" and insert -- resource manager 88 --, therefor.

In Column 11, Line 65, delete "resource manager 86" and insert -- resource manager 88 --, therefor.

In the Claims

In Column 14, Line 61, in Claim 21, delete "claim 19," and insert -- claim 20, --, therefor.